United States Patent
Fukushima

(10) Patent No.: US 12,192,456 B2
(45) Date of Patent: *Jan. 7, 2025

(54) IMAGE ENCODING DEVICE, IMAGE ENCODING METHOD, AND IMAGE ENCODING PROGRAM, AND IMAGE DECODING DEVICE, IMAGE DECODING METHOD, AND IMAGE DECODING PROGRAM

(71) Applicant: JVCKENWOOD Corporation, Yokohama (JP)

(72) Inventor: Shigeru Fukushima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 333 days.

This patent is subject to a terminal disclaimer.

(21) Appl. No.: 17/115,191

(22) Filed: Dec. 8, 2020

(65) Prior Publication Data

US 2021/0120244 A1 Apr. 22, 2021

Related U.S. Application Data

(63) Continuation of application No. 16/353,121, filed on Mar. 14, 2019, now Pat. No. 10,893,270, which is a
(Continued)

(30) Foreign Application Priority Data

Dec. 6, 2016 (JP) .................................. 2016-236507

(51) Int. Cl.
*H04N 19/60* (2014.01)
*H04N 19/119* (2014.01)
(Continued)

(52) U.S. Cl.
CPC ......... *H04N 19/119* (2014.11); *H04N 19/136* (2014.11); *H04N 19/176* (2014.11);
(Continued)

(58) Field of Classification Search
CPC .... H04N 19/96; H04N 19/122; H04N 19/593; H04N 19/196; H04N 19/46; H04N 19/70;
(Continued)

(56) References Cited

U.S. PATENT DOCUMENTS 8,265,144 B2 * 9/2012 Christoffersen ....... H04N 19/91
375/240.1
9,313,505 B2 * 4/2016 Horowitz ............. H04N 19/159
(Continued)

FOREIGN PATENT DOCUMENTS

JP 2013-098711 A 5/2013
JP 2015-516769 A 6/2015
(Continued)

OTHER PUBLICATIONS

Gary J. Sullivan, Overview of the High Efficiency Video Coding (HEVC) Standard, IEEE Transactions on Circuits and Systems for Video Technology, vol. 22, No. 12, Dec. 2012 (Year: 2012).*
(Continued)

*Primary Examiner* — Philip P. Dang
(74) *Attorney, Agent, or Firm* — Shih IP Law Group, PLLC

(57) ABSTRACT

An image encoding device adapted to segment an image into blocks and encode the image in units of blocks resulting from segmenting the image is provided. A block segmentation unit recursively segments the image into rectangles of a predetermined size to generate a block subject to encoding. A bitstream generation unit encodes block segmentation information of the block subject to encoding. The block segmentation unit includes: a quartering unit that quarters a
(Continued)

target block in recursive segmentation in a horizontal direction and a vertical direction to generate four blocks; and a halving unit that halves a target block in recursive segmentation in a horizontal or vertical direction to generate two blocks. When previous recursive segmentation is halving, the halving unit prohibits a target block subject to current recursive segmentation from being segmented in the same direction as a direction in which the block was segmented in the previous recursive segmentation.

6 Claims, 22 Drawing Sheets

Related U.S. Application Data continuation of application No. PCT/JP2017/021783, filed on Jun. 13, 2017.

(51) Int. Cl.
*H04N 19/136* (2014.01)
*H04N 19/176* (2014.01)
*H04N 19/192* (2014.01)
*H04N 19/196* (2014.01)
*H04N 19/46* (2014.01)
*H04N 19/70* (2014.01)
*H04N 19/96* (2014.01)

(52) U.S. Cl.
CPC ......... *H04N 19/192* (2014.11); *H04N 19/196* (2014.11); *H04N 19/46* (2014.11); *H04N 19/70* (2014.11); *H04N 19/96* (2014.11)

(58) Field of Classification Search
CPC .. H04N 19/119; H04N 19/136; H04N 19/176; H04N 19/192
See application file for complete search history.

(56) References Cited

U.S. PATENT DOCUMENTS

| | | | | |
|---|---|---|---|---|
| 9,503,702 B2* | 11/2016 | Chen | .................... | H04N 13/161 |
| 9,510,001 B2* | 11/2016 | Lee | ...................... | H04N 19/117 |
| 9,554,134 B2* | 1/2017 | Sermadevi | ............ | H04N 19/13 |
| 9,667,996 B2* | 5/2017 | Chen | ...................... | H04N 19/53 |
| 9,743,084 B2* | 8/2017 | Li | ........................ | H04N 19/176 |
| 9,762,927 B2* | 9/2017 | Chen | .................... | H04N 19/56 |
| 9,819,965 B2* | 11/2017 | Puri | ..................... | H04N 19/119 |
| 10,136,161 B2* | 11/2018 | Tsukuba | ................. | H04N 19/96 |
| 10,182,235 B2* | 1/2019 | Su | .......................... | H04N 19/85 |
| 10,200,719 B2* | 2/2019 | Zhang | ................... | G06F 17/147 |
| 10,284,852 B2* | 5/2019 | Possos | ................. | H04N 19/182 |
| 10,924,743 B2* | 2/2021 | Li | ........................ | H04N 19/119 |
| 11,323,702 B2* | 5/2022 | Jaeger | .................. | H04N 19/119 |
| 2015/0215631 A1* | 7/2015 | Zhou | .................... | H04N 19/436 |
| | | | | 375/240.02 |
| 2015/0371613 A1* | 12/2015 | Patel | ...................... | G09G 5/395 |
| | | | | 345/549 |
| 2016/0050422 A1* | 2/2016 | Rosewarne | ............ | H04N 19/11 |
| | | | | 375/240.12 |
| 2017/0013279 A1* | 1/2017 | Puri | ....................... | H04N 19/85 |
| 2017/0150186 A1* | 5/2017 | Zhang | ................... | H04N 19/61 |
| 2017/0208336 A1* | 7/2017 | Li | ........................ | H04N 19/176 |
| 2017/0347096 A1* | 11/2017 | Hong | .................... | H04N 19/46 |
| 2018/0213264 A1* | 7/2018 | Zhang | ................... | H04N 19/96 |
| 2019/0260992 A1* | 8/2019 | Jin | ........................ | H04N 19/70 |

FOREIGN PATENT DOCUMENTS

| | | | |
|---|---|---|---|
| JP | 2015-526008 | A | 9/2015 |
| JP | 2013-543316 | A | 11/2018 |
| WO | 2012/101781 | A1 | 8/2012 |
| WO | 2016/031253 | A1 | 3/2016 |
| WO | 2016/091161 | A1 | 6/2016 |
| WO | 2017008678 | A1 | 1/2017 |

OTHER PUBLICATIONS

An, et al. "Quadtree plus binary tree structure integration with JEM tools"Joint Video Exploration Team (.NE1) of ITU-T SG 16 WP 3 and ISO/IEC JTC. 1/SC 29/WG 1l, 2nd Meeting: San Diego; USA, Feb. 20-26, 2016, 12 pages.

Wang, et al."Local-Constrained Quadtree Plus Binary Tree Block Partition Structure for Enhanced Video Coding"VCIP 2016, Nov. 27-30, 2016, Chengdu, China, 5 pages.

F. Le Leannec, et al., "Asymmetric Coding Units in QTBT", Joint Video Exploration Team (JVET) of ITU-T SG 16 WP 3 and ISO/IEC JTC 1/SC 29/WG 11, 4th Meeting: Chengdu, CN, Oct. 15-21, 2016, 5 pgs.

B. Wohlberg, et al., "A Review of the Fractal Image Coding Literature", IEEE Transactions on Image Processing, vol. 8, No. 12, Dec. 1999, pp. 1716-1729.

J. Chen, et al., Algorithm Description of Joint Exploration Test Model 5 (JEM 5), Joint Video Exploration Team (JVET) of ITU-T SG 16 WP 3 and ISO/IEC JTC 1/SC 29/WG 11, 5th Meeting: Geneva, CH, Jan. 12-20, 2017, 44 pgs.

Gary J. Sullivan, et al., "Overview of the High Efficiency Video Coding (HEVC) Standard", IEEE Transactions on Circuits and Systems for Video Technology, vol. 22, No. 12, Dec. 2012.

\* cited by examiner

FIG.14

```
4_division_flag
If(!4_division_flag){
    2_division_flag
    if(2_division_flag && !prev_2_division_flag){
        2_division_direction
    }
}
```

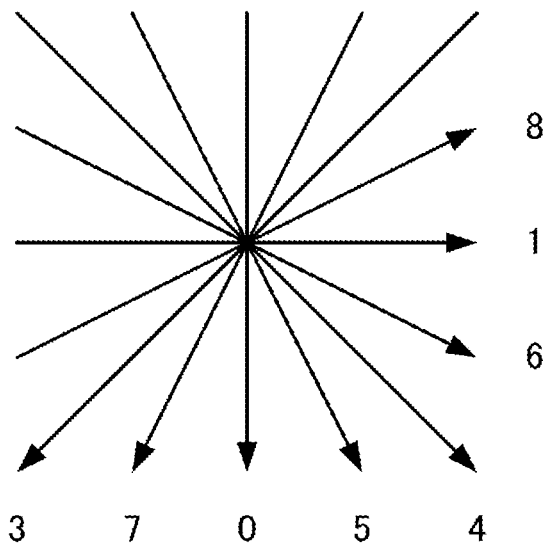
FIG.15A
| MODE NUMBER | PREDICTION DIRECTION |
|---|---|
| 0 | vertical |
| 1 | horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |
FIG.15B
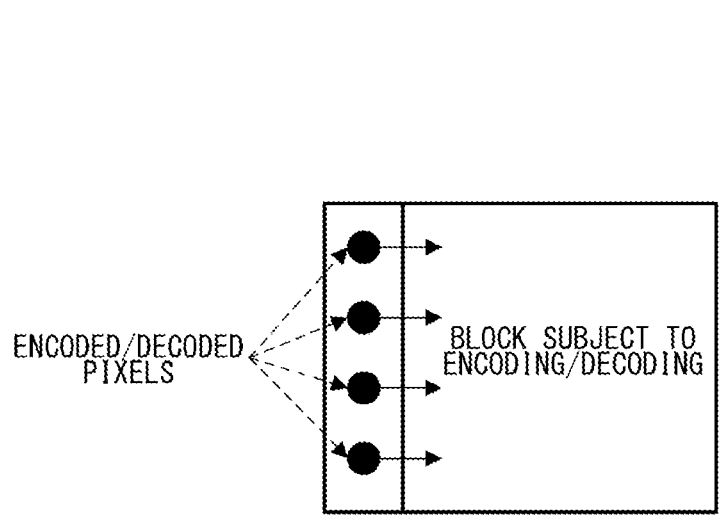
FIG.15C
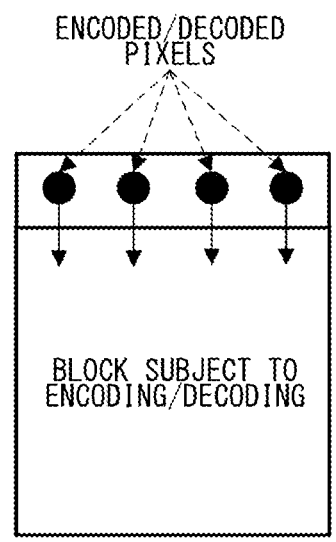
FIG.15D

FIG.17

```
If(blocksize > 64){
  4_division_flag
  If(!4_division_flag){
      2_division_flag
      if(2_division_flag && !prev_2_division_flag){
         2_division_direction
      }
    }
  }
}
```

FIG.18

```
If(blocksize > 64){
  4_division_flag
  If(!4_division_flag){
    If(blocksize > 32){
      2_division_flag
      if(2_division_flag && !prev_2_division_flag){
        2_division_direction
      }
    }
  }
}
```

FIG.19

```
4_division_flag
If(!4_division_flag){
    2_division_flag
    if(2_division_flag && !(prev_2_division_flag && prev_2_division_direction)){
        2_division_direction
    }
}
```

FIG.20
HALVED HORIZONTALLY
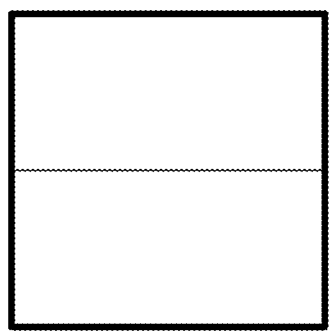
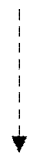
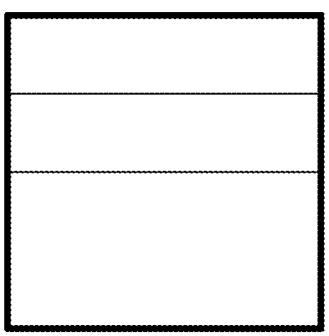
FURTHER HALVED
HORIZONTALLY
HALVED VERTICALLY
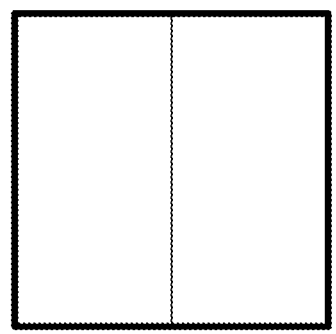
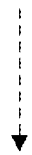
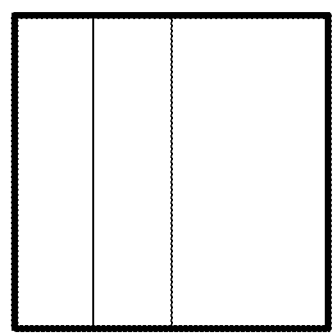
FURTHER HALVED
VERTICALLY

FIG.21

```
If(!2_division_after_4_division_flag){
  4_division_flag
  If(!4_division_flag){
      2_division_flag
      if(2_division_flag && !prev_2_division_flag){
         2_division_direction
      }
    }
  }
}
```

FIG.22
HALVED VERTICALLY
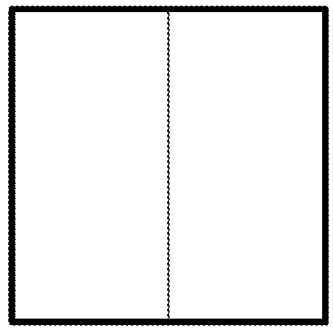
HALVED HORIZONTALLY
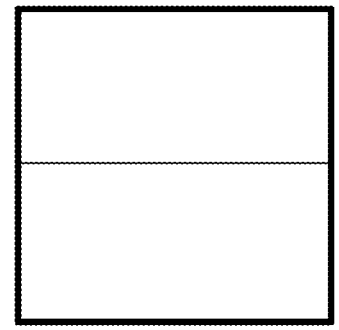
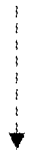
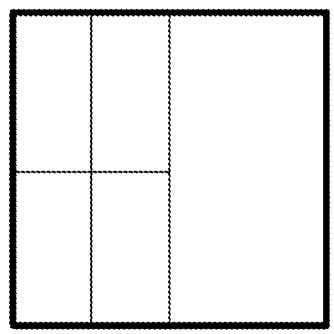
FURTHER QUARTERED
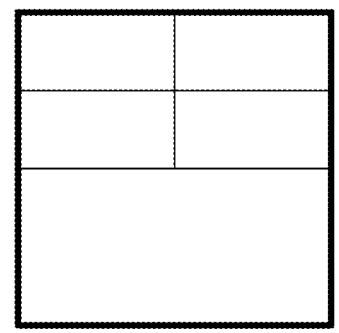
FURTHER QUARTERED

IMAGE ENCODING DEVICE, IMAGE ENCODING METHOD, AND IMAGE ENCODING PROGRAM, AND IMAGE DECODING DEVICE, IMAGE DECODING METHOD, AND IMAGE DECODING PROGRAM

CROSS-REFERENCE TO RELATED APPLICATION

This application is a Continuation of U.S. Ser. No. 16/353,121, filed Mar. 14, 2019; which is a Continuation of International Application No.: PCT/JP2017/021783, filed Jun. 13, 2017; which claims the benefit of priority from the prior Japanese Patent Application No. 2016-236507, filed on Dec. 6, 2016, the entire contents of which are incorporated herein by reference.

BACKGROUND OF THE INVENTION

1. Field of the Invention

The present invention relates to a technology of segmenting an image into blocks and encoding and decoding the image in units of blocks resulting from segmenting the image.

2. Description of the Related Art

In image encoding and decoding, an image is segmented into blocks, each of which is a set of a predetermined number of pixels. The image is encoded and decoded in units of blocks. By performing proper block segmentation, the efficiency of intra-picture prediction (intra prediction), inter-picture prediction (inter prediction), orthogonal transform, entropy encoding, etc. is improved. As a result, the encoding efficiency is improved.
[patent document 1] JP2015-526008
Unless an image is segmented into blocks of proper sizes and shapes, the encoding efficiency is reduced. If an image is not segmented into blocks of proper sizes and shapes, the processing volume in the subsequent encoding and decoding will be increased.

SUMMARY OF THE INVENTION

The present invention addresses the aforementioned issue, and a purpose thereof is to provide a technology of improving the encoding efficiency by performing block segmentation suited to image encoding and decoding.

An image encoding device according to an embodiment is adapted to segment an image into blocks and encode the image in units of blocks resulting from segmenting the image and includes: a block segmentation unit (101) that recursively segments the image into rectangles of a predetermined size to generate a block subject to encoding; and an encoding unit (105) that encodes block segmentation information of the block subject to encoding. The block segmentation unit includes: a quartering unit that quarters a target block in recursive segmentation in a horizontal direction and a vertical direction to generate four blocks; and a halving unit that halves a target block in recursive segmentation in a horizontal direction or a vertical direction to generate two blocks. When previous recursive segmentation is halving, the halving unit prohibits a target block subject to current recursive segmentation from being segmented in the same direction as a direction in which the block was segmented in the previous recursive segmentation.

Another embodiment also relates to an image encoding device. The device is adapted to segment an image into blocks and encode the image in units of blocks resulting from segmenting the image and includes: a block segmentation unit (101) that recursively segments the image into rectangles of a predetermined size to generate a block subject to encoding; and an encoding unit (105) that encodes block segmentation information of the block subject to encoding. The block segmentation unit includes: a quartering unit that quarters a target block in recursive segmentation in a horizontal direction and a vertical direction to generate four blocks; and a halving unit that halves a target block in recursive segmentation in a horizontal direction or a vertical direction to generate two blocks. When the last but one recursive segmentation is halving and previous recursive segmentation is quartering, the block segmentation unit prohibits further segmentation of the target block.

Still another embodiment relates to an image encoding method. The method is adapted to segment an image into blocks and encode the image in units of blocks resulting from segmenting the image and includes: recursively segmenting the image into rectangles of a predetermined size to generate a block subject to encoding; and encoding block segmentation information of the block subject to encoding. The segmenting includes: quartering a target block in recursive segmentation in a horizontal direction and a vertical direction to generate four blocks; and halving a target block in recursive segmentation in a horizontal direction or a vertical direction to generate two blocks. When previous recursive segmentation is halving, the halving prohibits a target block subject to current recursive segmentation from being segmented in the same direction as a direction in which the block was segmented in the previous recursive segmentation.

Still another embodiment relates to an image decoding device. The device is adapted to decode an image in units of blocks resulting from segmenting the image and includes: a block segmentation unit (202) that generates a block subject to decoding based on decoded recursive block segmentation information; and a decoding unit (203, 204, 205) that decodes the block subject to decoding. The block segmentation unit includes: a quartering unit that quarters a target block in recursive segmentation in a horizontal direction and a vertical direction to generate four blocks; and a halving unit that halves a target block in recursive segmentation in a horizontal direction or a vertical direction to generate two blocks. When previous recursive segmentation is halving, the decoding unit does not decode a flag indicating whether to segment a target block subject to current recursive segmentation in the same direction as a direction in which the block was segmented in the previous recursive segmentation.

Still another embodiment also relates to an image decoding device. The device is adapted to decode an image in units of blocks resulting from segmenting the image and includes: a block segmentation unit (202) that generates a block subject to decoding based on decoded recursive block segmentation information; and a decoding unit that (203, 204, 205) decodes the block subject to decoding. The block segmentation unit includes: a quartering unit that quarters a target block in recursive segmentation in a horizontal direction and a vertical direction to generate four blocks; and a halving unit that halves a target block in recursive segmentation in a horizontal direction or a vertical direction to generate two blocks. When the last but one recursive segmentation is halving and previous recursive segmentation is quartering, the decoding unit does not decode a flag indicating whether to segment the target block further.

Still another embodiment relates to an image decoding method. The method is adapted to decode an image in units of blocks resulting from segmenting the image and includes: generating a block subject to decoding based on decoded recursive block segmentation information; and decoding the block subject to decoding. The segmenting includes: quartering a target block in recursive segmentation in a horizontal direction and a vertical direction to generate four blocks; and halving a target block in recursive segmentation in a horizontal direction or a vertical direction to generate two blocks. When previous recursive segmentation is halving, the decoding does not decode a flag indicating whether to segment a target block subject to current recursive segmentation in the same direction as a direction in which the block was segmented in the previous recursive segmentation.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 14 shows an example of syntax related to block segmentation according to the first embodiment;

FIGS. 15A-15D show intra prediction;

FIG. 17 shows an example of syntax related to block segmentation according to the second embodiment;

FIG. 18 shows another example of syntax related to block segmentation according to the second embodiment;

FIG. 19 shows an example of syntax related to block segmentation according to the third embodiment;

FIG. 20 shows how a block resulting from halving a parent block in the horizontal direction or the vertical direction is further segmented inside in the same direction;

FIG. 21 shows an example of syntax related to block segmentation according to the fourth embodiment; and FIG. 22 shows quartering of a block resulting from halving a tree block.

DETAILED DESCRIPTION OF THE INVENTION

The invention will now be described by reference to the preferred embodiments. This does not intend to limit the scope of the present invention, but to exemplify the invention.

Embodiments of the present invention provide an image encoding technology of segmenting an image into rectangular blocks and encoding and decoding a segment block.

First Embodiment

A description will be given of an image encoding device 100 and an image decoding device 200 according to the first embodiment. In the first embodiment, a block is restricted from being segmented successively in the same direction recursive block segmentation.

Figure 1:
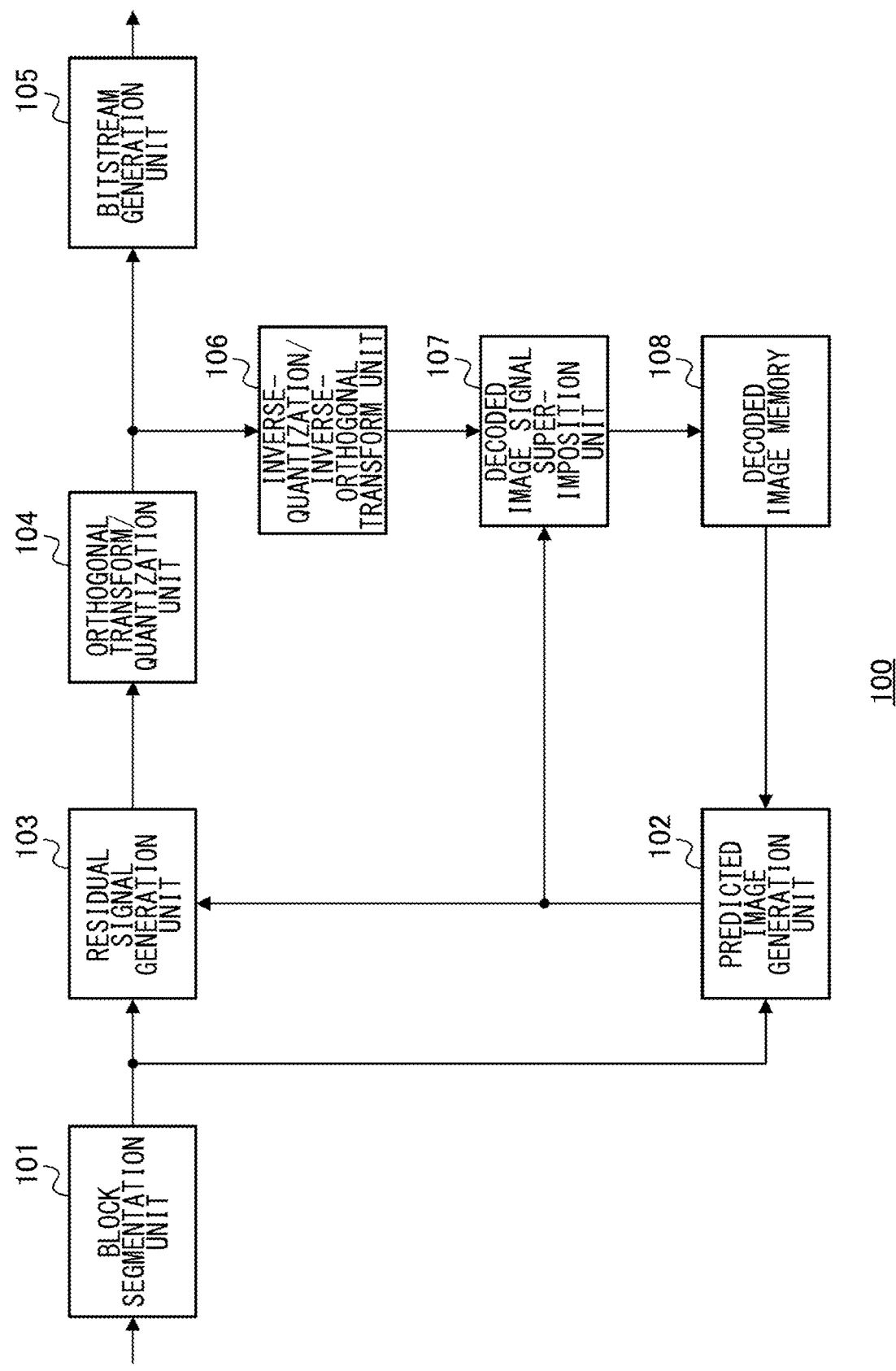
FIG. 1 shows a configuration of an image encoding device according to the first embodiment.

FIG. 1 shows a configuration of the image encoding device 100 according to the first embodiment; It should be noted that FIG. 1 only shows a flow of data related to an image signal. Additional information (e.g., a motion vector, a prediction mode, etc.) other than an image signal is supplied by relevant constituting elements to a bitstream generation unit 105 to generate associated encoded data, but the figure does not show a flow of data related to the additional information.

The block segmentation unit 101 segments an image into blocks subject to encoding, each of which is a unit of processing in encoding, and supplies an image signal in the block subject to encoding to a residual signal generation unit 103. Further, the block segmentation unit 101 supplies an image signal of a block subject to encoding to a predicted image generation unit 102 to evaluate a matching score of a predicted image.

The block segmentation unit 101 recursively segments an image into rectangles of a predetermined size to generate blocks subject to encoding. The block segmentation unit 101 includes a quartering unit that quarters a target block in recursive segmentation in the horizontal direction and the vertical direction to generate four blocks and a halving unit that halves a target block in recursive segmentation in the horizontal direction or the vertical direction to generate two blocks. The detailed operation of the block segmentation unit 101 will be described later.

The predicted image generation unit 102 performs intra-picture prediction (intra prediction) or inter-picture prediction (inter prediction) from a decoded image signal supplied from a decoded image memory 108 by referring to a prediction mode, thereby generating a predicted image signal. The image signal in the block subject to encoding supplied from the block segmentation unit 101 is used for evaluation of intra prediction and inter prediction. In intra prediction, a predicted image signal is generated by using the image signal of the block subject to encoding supplied from the block segmentation unit 101 and an image signal, supplied from the decoded image memory 108, of an encoded block neighboring the block subject to encoding and located in the same picture as the block subject to encoding. In inter prediction, an encoded picture, located before or after a picture including the block subject to encoding (encoding picture) in the time series and stored in the decoded image memory 108, is defined as a reference picture. An image signal of the block subject to encoding supplied from the block segmentation unit 101 is subject to evaluation for the degree of block-to-block coincidence (for example, subject to block matching) between the encoding picture and the reference picture. A motion vector indicating an amount of movement is determined, and a predicted image signal is generated by performing motion compensation based on the amount of movement from the reference picture. The predicted image generation unit 102 supplies the predicted image signal thus generated to the residual signal generation unit 103.

The residual signal generation unit 103 subtracts the predicted signal generated by the predicted image generation unit 102 from the image signal subject to encoding to generate a residual signal and supplies the residual signal to an orthogonal transform/quantization unit 104.

The orthogonal transform/quantization unit 104 subjects the residual signal supplied from the residual signal generation unit 103 to orthogonal transform and quantization and supplies the orthogonally transformed and quantized residual signal to the bitstream generation unit 105 and an inverse-quantization/inverse-orthogonal transform unit 106.

The bitstream generation unit 105 generates a bitstream corresponding to the orthogonally transformed and quantized residual signal supplied from the orthogonal transform/quantization unit 104. The bitstream generation unit 105 also generates a bitstream corresponding to additional information such as the motion vector, prediction mode, and block segmentation information.

The inverse-quantization/inverse-orthogonal transform unit 106 subjects the orthogonally transformed and quantized residual signal supplied from the orthogonal transform/quantization unit 104 to inverse-quantization/inverse-orthogonal transform and supplies the residual signal subjected to inverse-quantization and inverse-orthogonal transform to a decoded image signal superimposition unit 107.

The decoded image signal superimposition unit 107 superimposes the predicted image signal generated by the predicted image generation unit 102 and the residual signal subjected to inverse-quantization and inverse-orthogonal transform by the inverse-quantization/inverse-orthogonal transform unit 106 one upon the other so as to generate a decoded image. The decoded image signal superimposition unit 107 stores the decoded image in the decoded image memory 108. The decoded image may be subject to filtering for reducing block distortion, etc. resulting from encoding before being stored in the decoded image memory 108.

Figure 2:
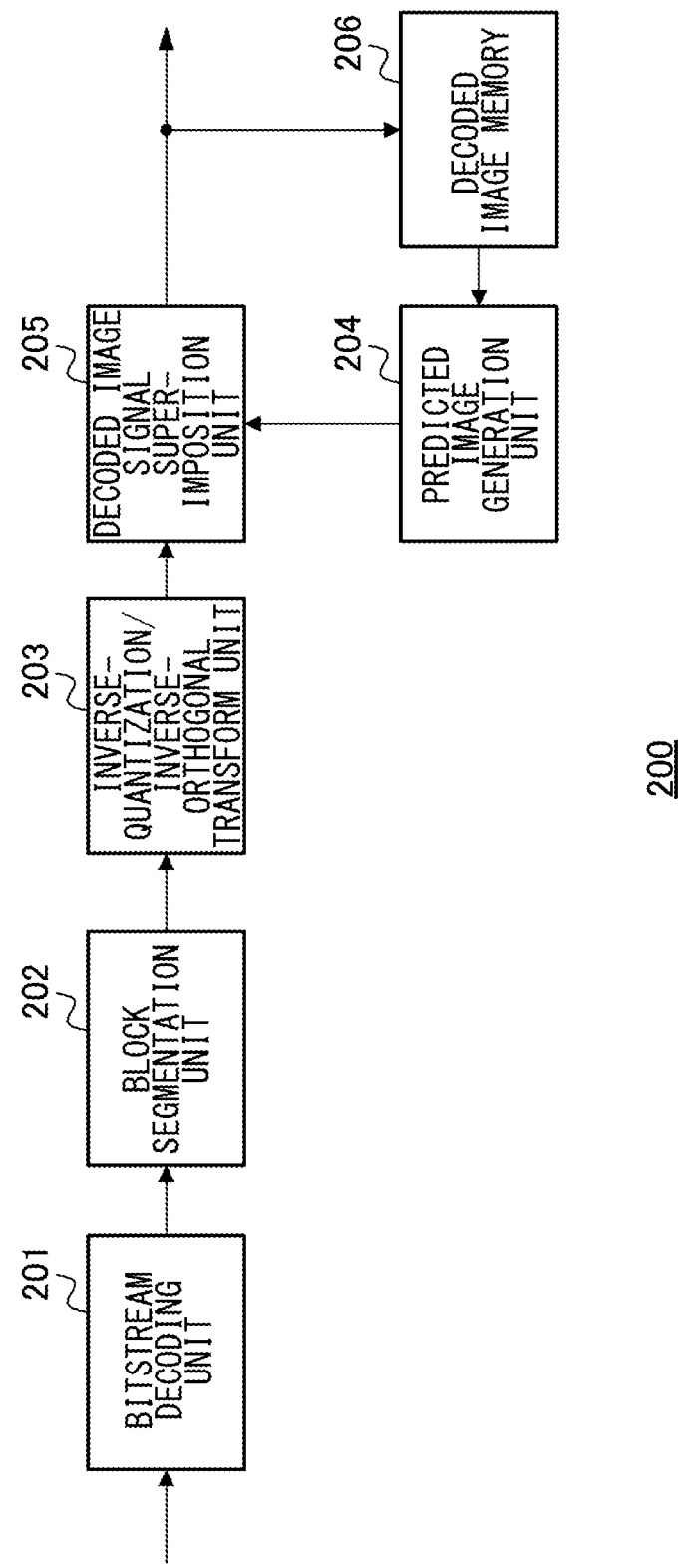
FIG. 2 shows a configuration of an image decoding device according to the first embodiment.

FIG. 2 shows a configuration of an image decoding device 200 according to the first embodiment. It should be noted that FIG. 2 only shows a flow of data related to an image signal. Additional information (e.g., a motion vector, a prediction mode, etc.) other than an image signal is supplied by a bitstream decoding unit 201 to relevant constituting elements and used in an associated process, but the figure does not show a flow of data related to the additional information.

The bitstream decoding unit 201 decodes the supplied bitstream and supplies the orthogonally transformed and quantized residual signal to a block segmentation unit 202.

The block segmentation unit 202 determines the shape of a block subject to decoding based on the decoded block segmentation information and supplies the orthogonally transformed and quantized residual signal of the block subject to decoding thus determined to an inverse-quantization/inverse-orthogonal transform unit 203.

The block segmentation unit 202 recursively segments the image into rectangles of a predetermined size based on the decoded block segmentation information to generate a block subject to decoding. The block segmentation unit 202 includes a quartering unit that quarters a target block in recursive segmentation in the horizontal direction and the vertical direction to generate four blocks and a halving unit that halves a target block in recursive segmentation in the horizontal direction or the vertical direction to generate two blocks. The detailed operation of the block segmentation unit 202 will be described later.

The inverse-quantization/inverse-orthogonal transform unit 203 subjects the orthogonally transformed and quantized residual signal supplied to inverse-quantization and inverse-orthogonal transform so as to obtain a residual signal subjected to inverse-quantization and inverse-orthogonal transform.

The predicted image generation unit 204 generates a predicted image signal from the decoded image signal supplied from a decoded image memory 206 and supplies the predicted image to a decoded image signal superimposition unit 205.

The decoded image signal superimposition unit 205 superimposes predicted image signal generated by the predicted image generation unit 204 and the residual signal subjected to inverse-quantization and inverse-orthogonal transform by the inverse-quantization/inverse-orthogonal transform unit 203 one upon the other so as to generate and output a decoded image signal. The decoded image signal superimposition unit 205 stores the decoded image signal in the decoded image memory 206. The decoded image may be subject to filtering for reducing block distortion, etc. resulting from encoding before being stored in the decoded image memory 206.

Figure 3:
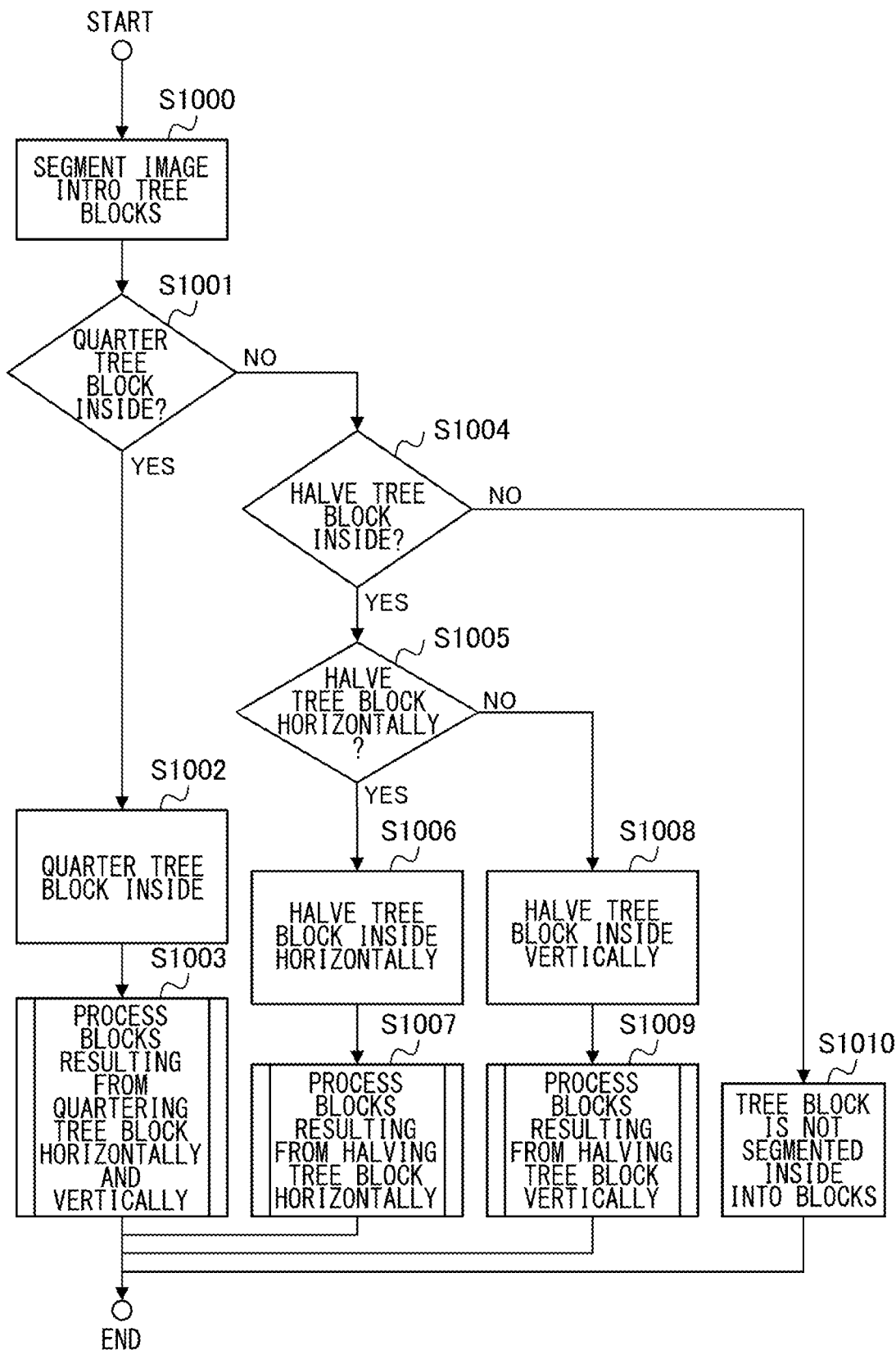
FIG. 3 is a flowchart showing segmentation into tree blocks and segmentation within a tree block.

A detailed description will be given of the operation of the block segmentation unit 101 of the image encoding device 100. FIG. 3 is a flowchart showing segmentation into tree blocks and segmentation within a tree block.

Figure 4:
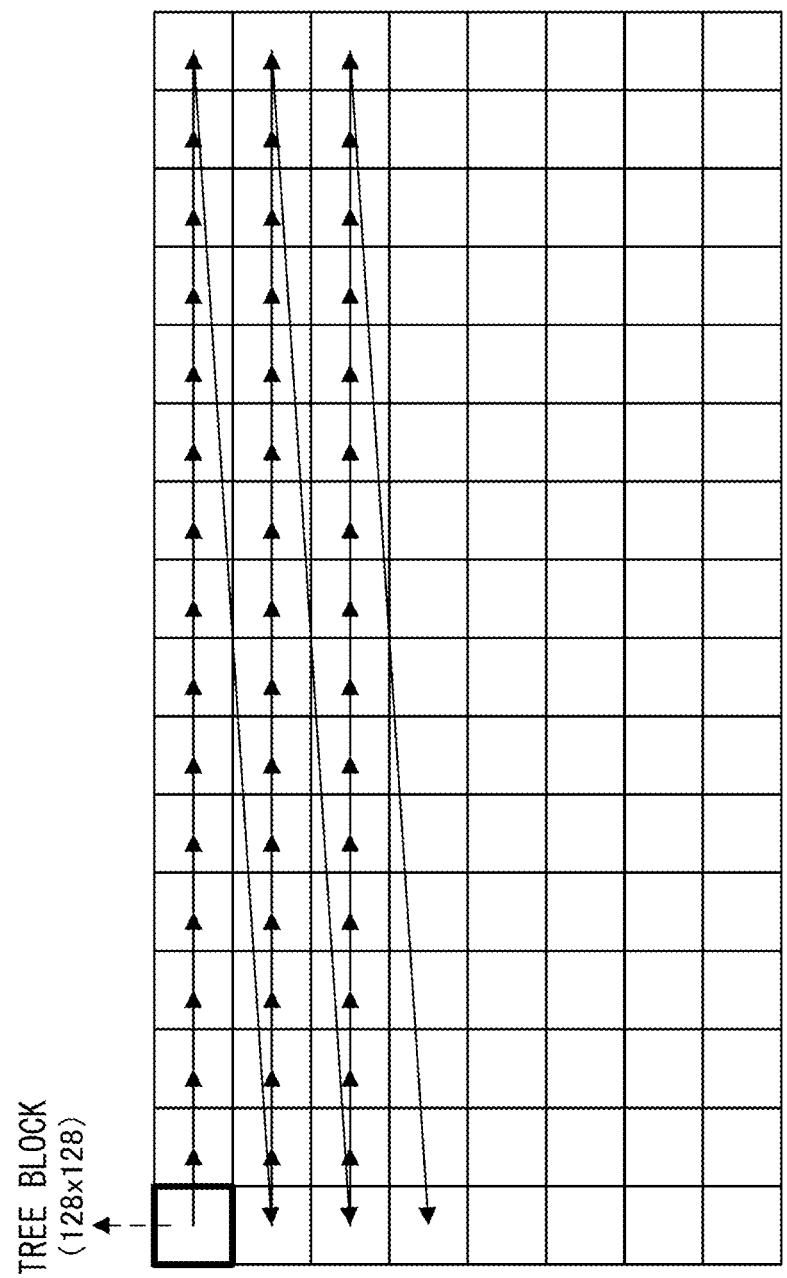
FIG. 4 shows how an input image is segmented into tree blocks.

First, an input image is segmented into tree blocks of a predetermined size (S1000). For example, a tree block includes 128 pixels×128 pixels. However, a tree block need not necessarily include 128 pixels×128 pixels. Any size and shape may be used so long as the tree block is rectangular. The fixed values defining the size and shape of a tree block may be established in the encoding device and the decoding device. The encoding device may determine the size and shape and record the size and shape in the bitstream, and the decoding device may use the recorded block size. FIG. 4 shows how an input image is segmented into tree blocks. Tree blocks are encoded and decoded in the order of raster scan, i.e., from left to right and from top to bottom.

Figure 5:
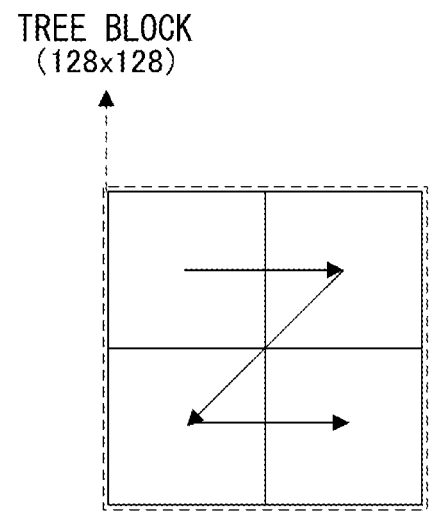
FIG. 5 shows z-scan.
Figure 6:
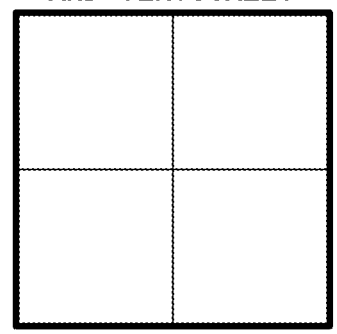
FIG. 6 shows a tree block quartered in the horizontal and vertical directions.
Figure 7:
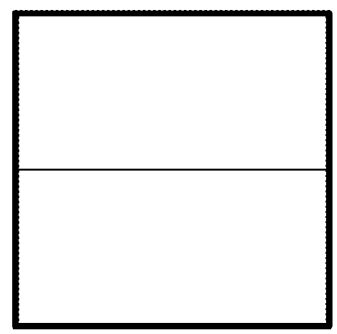
FIG. 7 shows a tree block halved in the horizontal direction.
Figure 8:
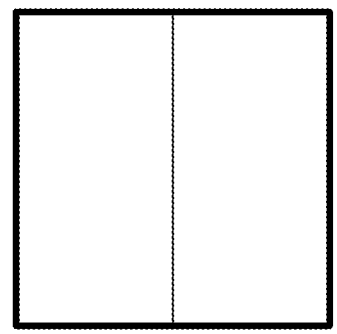
FIG. 8 shows a tree block halved in the vertical direction.

A tree block is further segmented inside into rectangular blocks. A tree block is encoded and decoded inside in the order of z-scan. FIG. 5 shows the order of z-scan. In z-scan, the top left block, the top right block, the bottom left block, and the bottom right block are encoded and decoded in the stated order. A tree block can be quartered or halved inside. In quartering, a tree block is segmented in the horizontal direction and the vertical direction. In halving, a tree block is segmented in the horizontal direction or the vertical direction. FIG. 6 shows a tree block quartered in the horizontal and vertical directions. FIG. 7 shows a tree block halved in the horizontal direction. FIG. 8 shows a tree block halved in the vertical direction.

Reference is made back to FIG. 3. A determination is made as to whether to quarter a tree block inside in the horizontal direction and the vertical direction (S1001).

Figure 9:
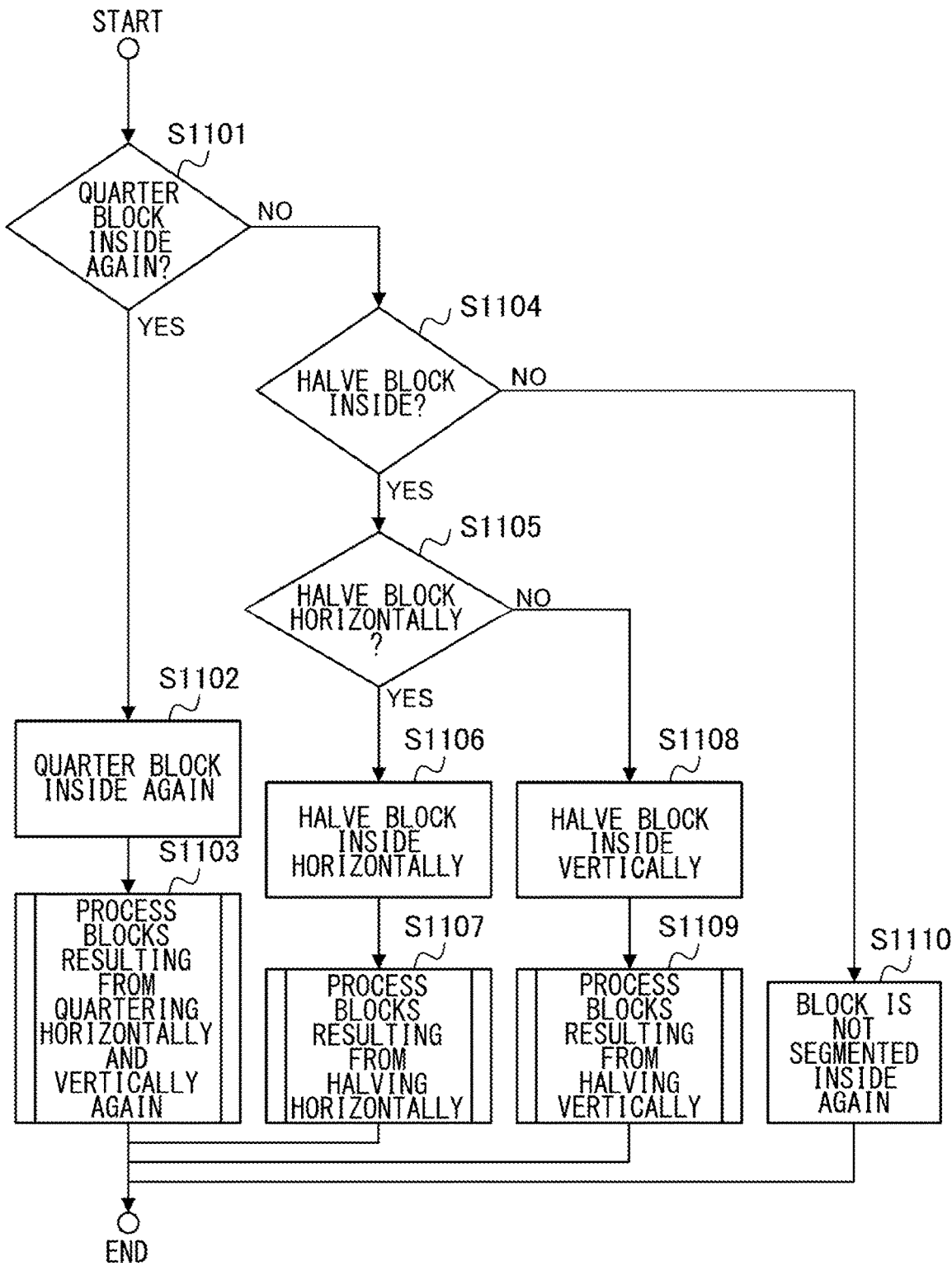
FIG. 9 is a flowchart showing a process in each block resulting from quartering a tree block in the horizontal direction and the vertical direction.

When it is determined to quarter the tree block inside (S1001: Yes), the tree block is quartered inside (S1002), and the blocks resulting from quartering the tree block in the horizontal and vertical directions are processed respectively (S1003). Re-segmentation of the blocks resulting from quartering the tree block will be described later (FIG. 9).

When it is determined not to quarter the tree block inside (S1001: No), a determination is made as to whether to halve the tree block inside (S1004).

When it is determined to halve the tree block inside (S1004: Yes), a determination is made as to whether to halve the tree block in the horizontal direction (S1005).

Figure 10:
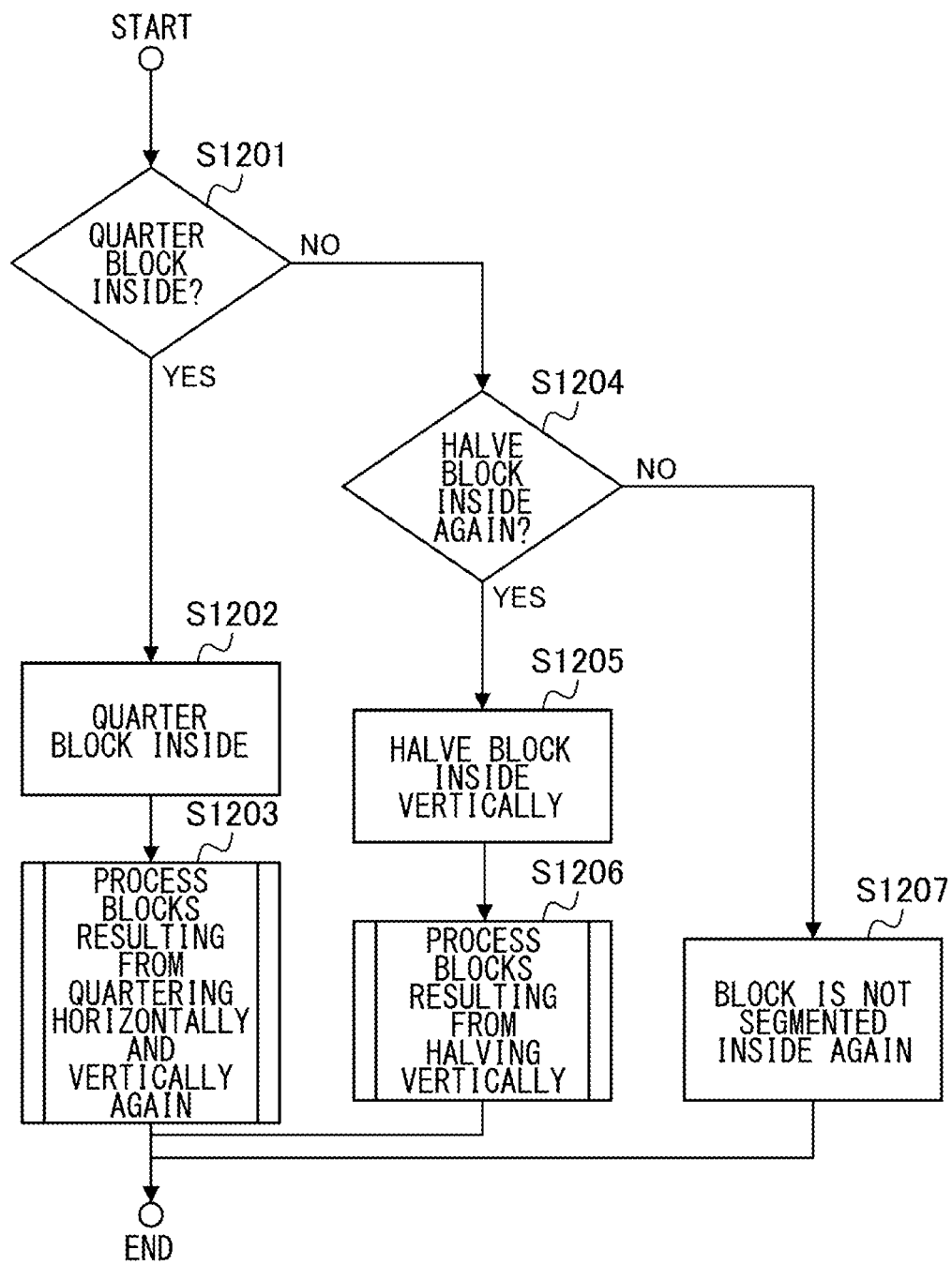
FIG. 10 is a flowchart showing a process in each block resulting from halving a tree block in the horizontal direction.

When it is determined to halve the block in the horizontal direction (S1005: Yes), the tree block is halved inside in the horizontal direction (S1006), and the blocks resulting from halving the tree block in the horizontal direction are processed respectively (S1007). Re-segmentation of the blocks resulting from halving the tree block in the horizontal direction will be described later (FIG. 10).

Figure 11:
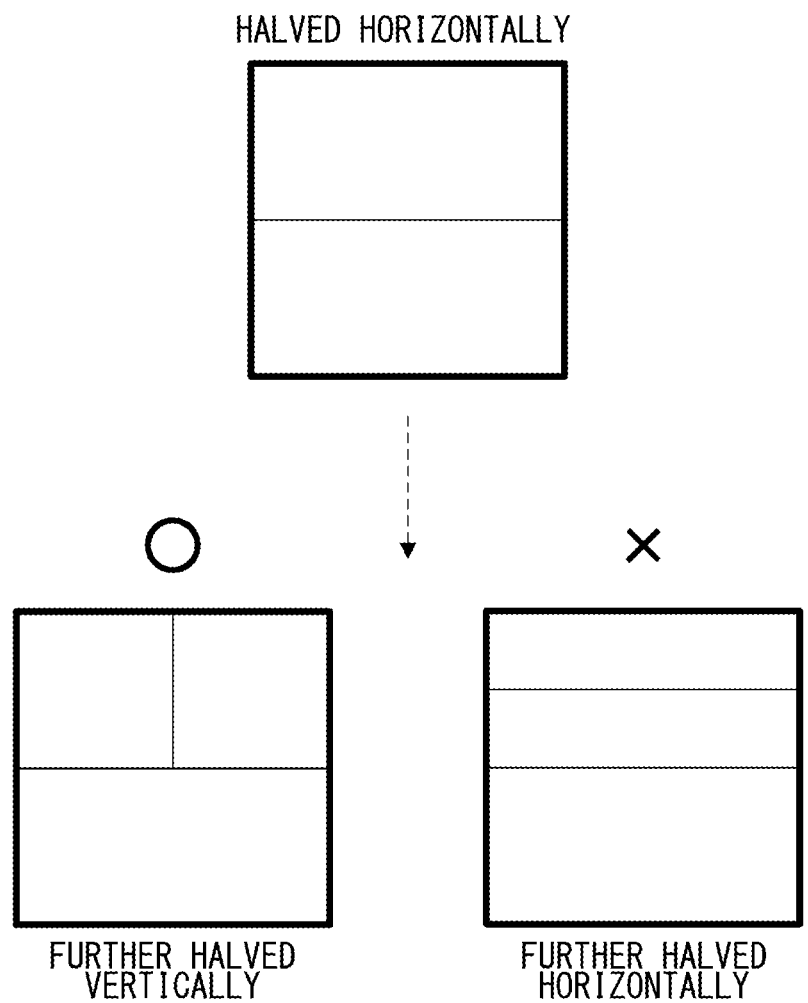
FIG. 11 shows how a block resulting from halving a tree block in the horizontal direction is re-segmented.

When it is determined to halve the tree block in the vertical direction instead of the horizontal direction (S1005: No), the tree block is halved inside in the vertical direction (S1008), and the blocks resulting from halving the tree block in the vertical direction are processed respectively (S1009). Re-segmentation of the blocks resulting from halving the tree block in the vertical direction will be described later (FIG. 11).

When it is determined not to halve the tree block inside (S1004: No), the tree block is not segmented inside and the block segmentation process is terminated (S1010).

A description will now be given of a process of each block resulting from quartering the tree block in the horizontal and vertical directions with reference to the flowchart of FIG. 9.

A determination is made as to whether to quarter a block inside again in the horizontal and vertical directions (S1101).

When it is determined to quarter the block inside again (S1101: Yes), the block is quartered inside again (S1102), and the blocks resulting from quartering the block in the horizontal and vertical directions are processed respectively (S1103).

When it is determined not to quarter the block inside again (S1101: No), a determination is made as to whether to halve the block inside (S1104).

When it is determined to halve the block inside (S1104: Yes), a determination is made as to whether to halve the block in the horizontal direction (S1105).

When it is determined to halve the block in the horizontal direction (S1105: Yes), the block is halved inside in the horizontal direction (S1106), and the blocks resulting from halving the block in the horizontal direction are processed respectively (S1107).

When it is determined to halve the lock in the vertical direction instead of the horizontal direction (S1105: No), the block is halved inside in the vertical direction (S1108), and the blocks resulting from halving the block in the vertical direction are processed respectively (S1109).

When it is determined not to halve the block inside (S1104: No), the block is not segmented inside and the block segmentation process is terminated (S1110).

The process shown in the flowchart of FIG. 9 is performed for each block resulting from the quartering. The blocks resulting from quartering a block is also encoded and decoded inside in the order of z-scan.

A description will now be given of the process of each block resulting from halving a tree block in the horizontal direction with reference to the flowchart of FIG. 10.

When a tree block is halved in the horizontal direction, a determination is made as to whether to quarter each block resulting from halving the tree block in the horizontal and vertical directions inside (S1201).

When it is determined to quarter the block inside (S1201: Yes), the block is quartered inside (S1202), and the blocks resulting from quartering the block in the horizontal and vertical directions are processed respectively (S1203).

When it is determined not to quarter the block inside (S1201: No), a determination is made as to whether to halve the block inside again (S1204).

When it is determined to halve the block again (S1204: Yes), the block is halved inside in the vertical direction (S1205), and the blocks resulting from halving the block in the vertical direction are processed respectively (S1206).

When it is determined not to halve the block again (S1204: No), the block is not segmented inside again and the block segmentation process is terminated (S1207).

FIG. 11 shows how a block resulting from halving a tree block in the horizontal direction is re-segmented. In this case, when a tree block (parent block) is halved in the horizontal direction, the re-halving of the segment block is permitted only in the vertical direction, and the block is halved in the vertical direction automatically. Quartering of a child block resulting from halving a tree block (parent block) may be completely prohibited. This prohibits a block from being segmented in the same direction as the parent block and so prevents block segmentation that results in a rectangle further elongated in the lateral direction, facilitating the encoding and decoding process.

The process shown in the flowchart of FIG. 10 is performed for each block resulting from halving a parent block in the horizontal direction. The blocks resulting from halving a parent block is also encoded and decoded inside from top to bottom.

A description will now be given of the process of each block resulting from halving a tree block in the vertical direction with reference to the flowchart of FIG. 12.

When a tree block is halved in the vertical direction, a determination is made as to whether to quarter each block resulting from halving the tree block is quartered in the horizontal and vertical directions inside (S1301).

When it is determined to quarter the block inside (S1301: Yes), the block is quartered inside (S1302), and the blocks resulting from quartering the block in the horizontal and vertical directions are processed respectively (S1303).

When it is determined not to quarter the block inside (S1301: No), a determination is made as to whether to halve the block inside again (S1304).

When it is determined to halve the block again (S1304: Yes), the block is halved inside in the horizontal direction (S1305), and the blocks resulting from halving the block in the horizontal direction are processed respectively (S1306).

When it is determined not to halve the block again (S1304: No), the block is not segmented inside again and the block segmentation process is terminated (S1307).

Figure 13:
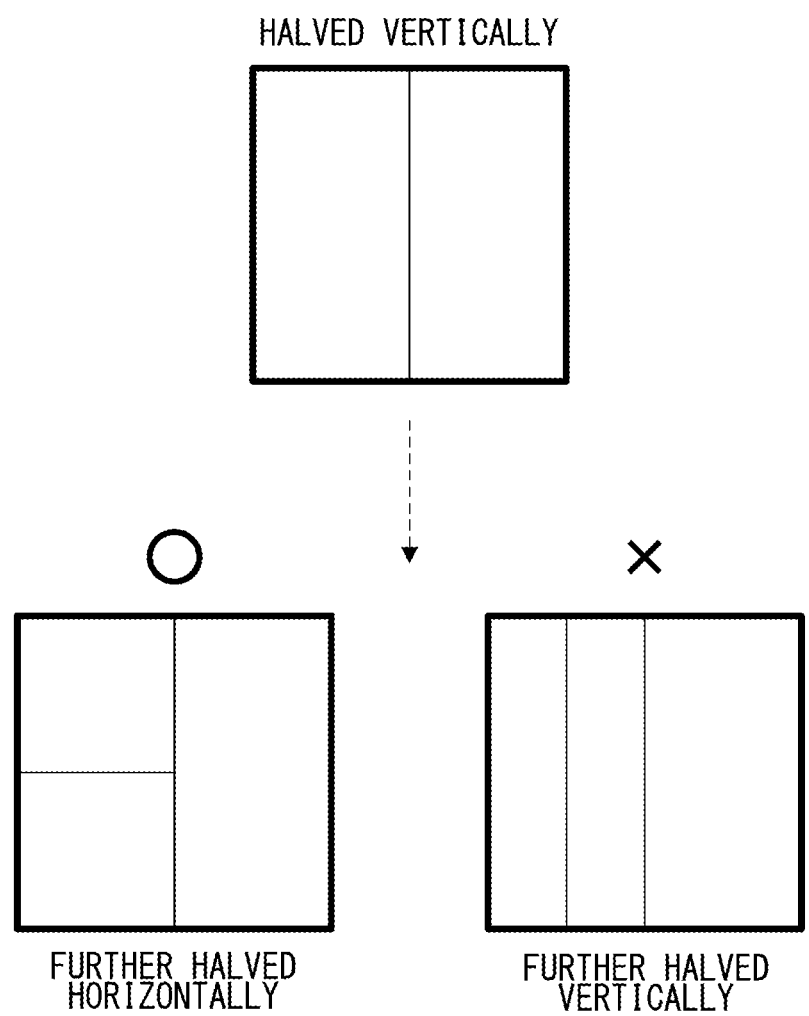
FIG. 13 shows how a block resulting from halving a tree block in the vertical direction is re-segmented.

FIG. 13 shows how a block resulting from halving a tree block in the vertical direction is re-segmented. In this case, when a tree block (parent block) is halved in the vertical direction, the re-halving of the segment block is permitted only in the horizontal direction, and the block is halved in the horizontal direction automatically. Quartering of a child block resulting from halving a tree block (parent block) may be completely prohibited. This prohibits a block from segmented in the same direction as the parent block and so prevents block segmentation that results in a rectangle further elongated in the vertical direction, facilitating the encoding and decoding process.

Figure 12:
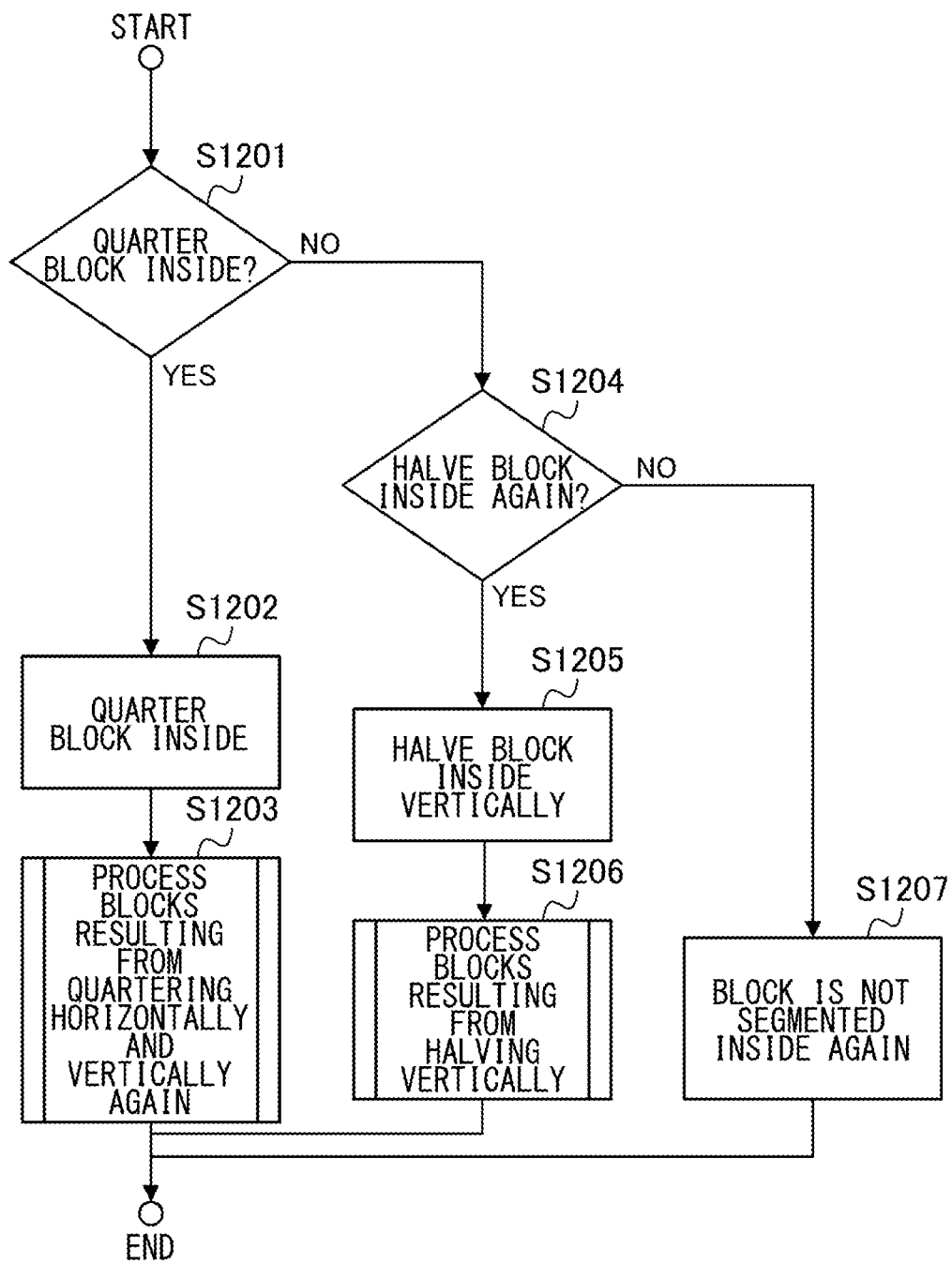
FIG. 12 is a flowchart showing a process in each block resulting from halving a tree block in the vertical direction.

The process shown in the flowchart of FIG. 12 is performed for each block resulting from halving a parent block in the vertical direction. The blocks resulting from halving a parent block are also encoded and decoded inside from left to right.

While re-segmentation of a block resulting from segmenting a tree block has been described above, a parent block need not be a tree block. For example. the above process may be applied to the segmentation of a block resulting from quartering a tree block (128×128) and further quartering or halving the block (64×64) resulting from quartering the tree block.

A description will now be given of the operation of the block segmentation unit 202 of the image decoding device 200. The block segmentation unit 202 segments a block through the same processing steps as performed in the block segmentation unit 101 of the image encoding device 100. The block segmentation unit 101 of the image encoding device 100 selects a pattern of block segmentation and outputs block segmentation information indicating the selection. The block segmentation unit 202 of the image decoding device differs in that it segments a block by using the block segmentation information retrieved from the bitstream by decoding the bitstream and employs a syntax structure in which the block segmentation information is retrieved from the bitstream by decoding the bitstream such that the information that lacks an option is not transferred in the bitstream when re-segmentation in the same direction is prohibited.

FIG. 14 shows an example of syntax (syntactic rule of a bitstream) related to block segmentation according to the first embodiment. For segmentation of a tree block inside, a flag (4_division_flag) indicating whether to quarter the tree block is first transmitted and received. In the case the tree block is quartered (4_division_flag is set to 1), the tree block is quartered and the process is terminated. The block resulting from quartering the tree block is then re-segmented inside again according to the syntax shown in FIG. 14. In the case the tree block is not quartered (4_division_flag is set to 0), a flag (2_division_flag) indicating whether to halve the tree block is transmitted and received. In the case the tree block is halved (2_division_flag is set to 1), a flag (2_division_direction) indicating the direction of halving is transmitted and received. 2_division_direction set to 1 means segmentation in the vertical direction, and 2_division_direction set to 0 means segmentation in the horizontal direction. The block resulting from halving the tree block is then re-segmented inside again according to the syntax shown in FIG. 14. In the case the tree block is not halved (2_division_flag is set to 0), the tree block is not segmented, and the process is terminated.

A description will now be given of the process of re-segmenting the block resulting from quartering or halving a block will be described. The process of re-segmenting the block inside also uses the syntax shown in FIG. 14 but differs from the process of segmenting a tree block in that the direction of halving is restricted. Specifically, when a tree block is halved and the block resulting from halving the tree block is re-segmented, segmentation in the same direction as the direction of halving the tree block is prohibited. This prevents a block resulting from the segmentation from being a further elongated rectangle, thereby preventing an increase in the memory bandwidth necessary for intra prediction and inter prediction. Details of prevention of an increase in the memory bandwidth will be discussed later.

Of course, the number of times of halving in the same direction may be counted, and segmentation in the same direction may be restricted when the number of times exceeds a predetermined count. For example, halving in the same direction may permitted twice, but halving in the same direction for the third time may be prohibited.

Referring to the syntax of FIG. 14, quartering is selected preferentially, and the information indicating whether to quarter a block is transmitted and received before the information indicating whether to halve the block. In the case halving is selected preferentially, on the other hand, the syntax may be such that the information indicating whether to halve a block is transmitted and received before the information indicating whether to quarter the block. This is because the volume of the code transmitted in a bitstream will be smaller by transmitting and receiving an event that is more likely to occur. In other words, an estimation is made in advance to see which of quartering and halving is more likely to occur and the syntax is configured to first transmit and receive segmentation information indicating the segmentation that is more likely to occur. For example, by indicating whether to prioritize quartering or prioritize halving when transmitting and receiving the header information of an image, the encoding device can adaptively determine a prioritized segmentation type (the number of segment blocks) that will result in a higher coding efficiency, and the decoding device can segment a tree block according to the syntax based on the selected prioritized segmentation type.

In the image encoding device 100 and the image decoding device 200, intra prediction or inter prediction is performed by using segmented blocks. Both intra prediction and inter prediction accompany copying of pixels from a memory.

FIGS. 15A-15D show an example of intra prediction. FIGS. 15A and 15B show prediction directions and mode numbers for intra prediction. In intra prediction, a predicted image of a block subject to encoding or decoding is generated by copying pixels from the encoded or decoded pixels in proximity to the block subject to encoding or decoding, as shown in FIGS. 15C and 15D. In intra prediction, generation of a predicted image and generation of encoded or decoded pixels are repeated in units of blocks. Therefore, the process proceeds sequentially in units of blocks so that the smaller a block is segmented inside, the larger the load from the whole process. Also, the more elongated the shape of a rectangular block, the heavier the process of copying pixels from the memory. Encoding and decoding requires orthogonal transform of a residual signal. Therefore, the larger the types of sizes of rectangles, the more numerous the necessary types of orthogonal transform and the larger the resultant circuit scale. Therefore, the memory bandwidth necessary for intra prediction is prevented from increasing when a block is halved inside, by restricting the block from being halved in the same direction as the direction in which the parent block is segmented.

Figure 16:
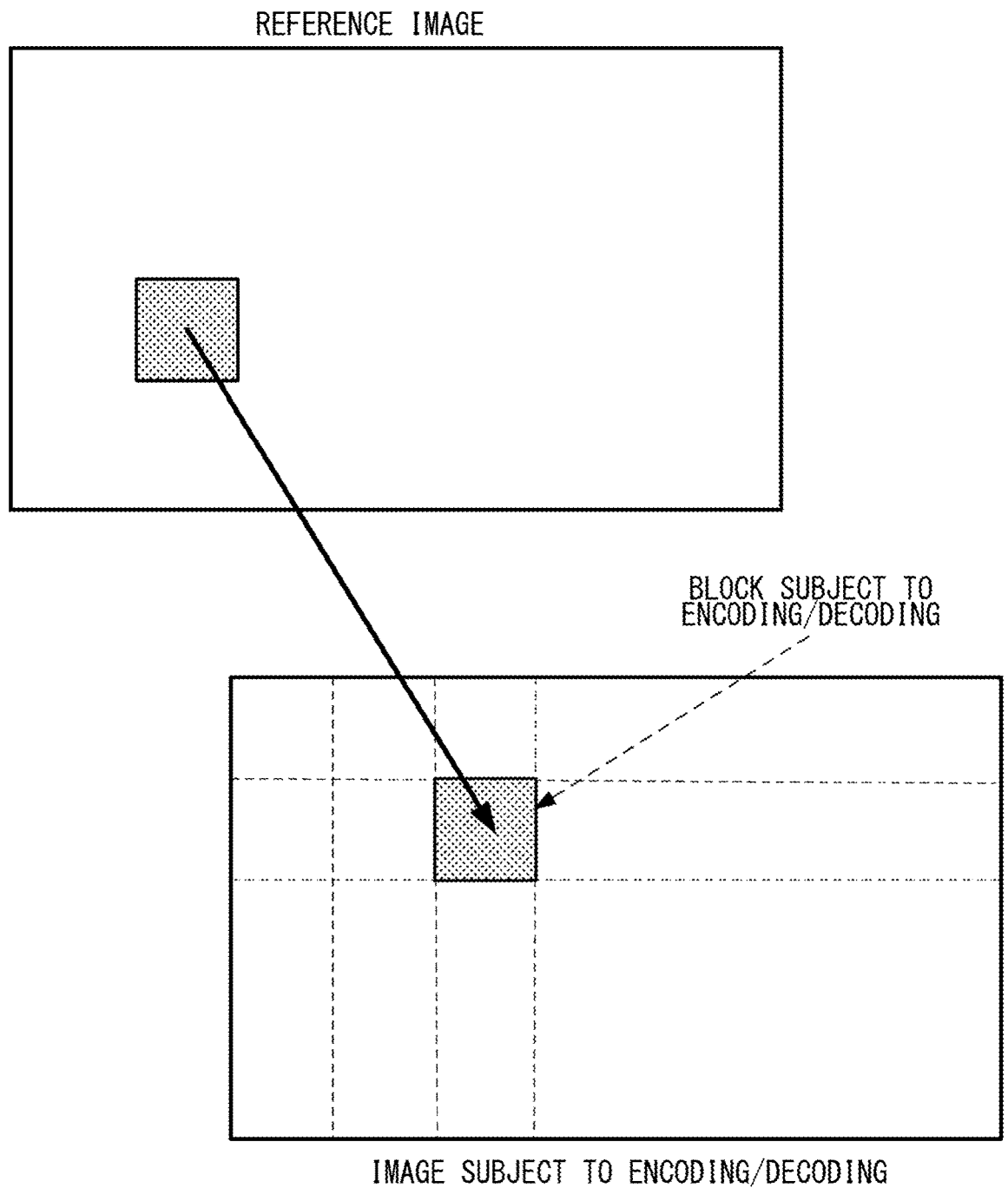
FIG. 16 shows inter prediction.

FIG. 16 shows an example of inter prediction. In inter prediction, a predicted image of a block subject to encoding or decoding is generated by copying, in units of blocks, pixels from the pixels included in the encoded or decoded image. Inter prediction often requires a device configuration in which pixels are copied from a reference image in units of blocks such that acquisition in units of memory management including necessary pixels is required. Therefore, the smaller a block is segmented and the more elongated the shape of a rectangular block, the larger the load from the whole process. Further, motion compensation of decimal accuracy in a reference image using an interpolation filter requires copying several pixels in addition to the pixels included in the block. Therefore, the smaller the size of a block, the larger the relative proportion of the several pixels added and the larger the load from the whole process. Accordingly, the memory bandwidth necessary for intra prediction is prevented from increasing when a block is halved inside, by restricting the block from being halved in the same direction as the direction in which the parent block is segmented.

Second Embodiment

A description will be given of an image encoding device and an image decoding device according to the second embodiment of the present invention. The second embodiment differs from the first embodiment in that, when a block is of a predetermined size or smaller, further segmentation of the block inside is restricted and is identical to the first embodiment in the other respects. This prevents the load from the whole process from continuing to increase as a block is segmented inside into smaller blocks.

FIGS. 17 and 18 show a syntax related to block segmentation according to the second embodiment. The difference from the syntax of FIG. 14 according to the first embodiment is that block segmentation is enabled only when the size of the initial block is larger than a predetermined size. In the case of FIG. 17, a block including more than 64 pixels inside can be quartered or halved.

In the case a difference between the number of pixels in a block resulting from quartering and that of a block resulting from halving is considered, quartering is permitted when the number of pixels in the block is larger than 64, and halving is permitted when the number of pixels in the block is larger than 32. In this way, restriction on the number of pixels in the block resulting from the segmentation is precisely controlled.

Third Embodiment

A description will be given of an image encoding device and an image decoding device according to the third embodiment. The third embodiment differs from the first embodiment in that further vertical segmentation of a block resulting from vertical segmentation is restricted and is identical to the first embodiment in the other respects.

Normally, pixel information of an image is stored in a one-dimensional memory in the order of raster scan. In a one-dimensional memory, pixels in the horizontal direction are stored relatively close to each other, and pixels in the vertical direction are stored relatively remote from each other. It is therefore easy to access pixels in the horizontal direction, but it is not easy to access pixels in the vertical direction. In the case of a block including 16 horizontal pixels×8 vertical pixels and a block including 8 horizontal pixels×16 vertical pixels, for example, the numbers of pixels are identical, but the block of 8 horizontal pixels×16 vertical pixels consumes a more extensive range of the memory to store the pixels than the block of 16 horizontal pixels×8 vertical pixels. Therefore, a larger memory bandwidth will be required for transfer of pixels when motion compensation is used.

FIG. 19 shows a syntax related to block segmentation according to the third embodiment. The difference from the syntax of FIG. 14 according to the first embodiment is that further vertical segmentation inside is prohibited only when a parent block is halved vertically. Specifically, when the parent block is halved vertically and the child block should be halved inside, selection between horizontal and vertical is not available, and horizontal segmentation is automatically selected, as shown in FIG. 20.

Fourth Embodiment

A description will be given of an image encoding device and an image decoding device according to the fourth embodiment of the present invention. The fourth embodiment differs from the first embodiment in that, when a block is halved and then the resultant block inside is quartered, further segmentation of the resultant block inside is prohibited and is identical to the first embodiment in the other respects.

FIG. 21 shows a syntax related to block segmentation according to the fourth embodiment. As shown in FIG. 22, when a parent block is halved and then the resultant block inside is quartered, 2 division after 4 division_flag is set to 1, prohibiting all subsequent segmentation.

That a block is halved and then quartered means that non-selection of quartering when halving is selected has been established. Therefore, the likelihood that further block segmentation is necessary after the block is halved and then quartered is low. In the case such further segmentation is necessary, quartering may be selected from the outset. In the case a block is halved and then quartered, the resultant block will already have a rectangular shape. Therefore, an attempt to prohibit the direction of halving after the quartering will complicate the process. By uniformly prohibiting subsequent segmentation of a block resulting from halving and subsequent quartering, a determination as to whether block segmentation is enabled is prevented from becoming complicated. Uniform prohibition of further block segmentation in a block resulting from halving and subsequent quartering makes it unnecessary to transmit and receive the selection not to segment the block and reduces the volume of the code transmitted.

It will of course be possible to combine a plurality of the schemes for restriction of block segmentation according to first through fourth embodiments.

The bitstream of images output from the image encoding device according to any of the embodiments described above has a predefined format so that it can be decoded in accordance with the encoding method used in the embodiments. The image decoding device compatible with the image encoding device is capable of decoding the bitstream of the predefined data format.

If a wired or wireless network is used to exchange bitstreams between the image encoding device and the image decoding device, the bitstream may be converted into a data format suited to the mode of transmission over the communication channel and be transmitted accordingly. In this case, there should be provided a transmitting device for converting the bitstreams output from the image encoding device into encoded data of a data format suited to the mode of transmission over the communication channel and for transmitting the bitstreams over the network, and a receiving device for receiving the bitstreams from the network to recover the bitstreams and supplying the recovered bitstreams to the image decoding device.

The transmitting device includes a memory for buffering bitstreams output from the image encoding device, a packet processing unit for packetizing the bitstreams, and a transmitting unit for transmitting the packetized bitstreams over the network. The receiving device includes a receiving unit for receiving the packetized encoded data over the network, a memory for buffering the received encoded data, and a packet processing unit for subjecting the encoded data to a packet process so as to generate bitstreams and providing the generated bitstreams to the image decoding device.

Further, a display unit for displaying an image decoded by the image decoding device may be added to configure a display device. In that case, the display unit reads a decoded image signal generated by the decoded image signal superimposition unit 205 and stored in the decoded image memory 206 and displays the image on the screen.

Further, an imaging device may be configured by adding an imaging unit and feeding a captured image to the image encoding device. In that case, the imaging unit feeds an image signal captured to the block segmentation unit 101.

The above-described processes related to encoding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An image encoding device adapted to segment an image into blocks and encode the image in units of blocks resulting from segmenting the image, comprising:
   a block segmentation unit that recursively segments the image into rectangles of a predetermined size to generate a target block subject to encoding; and
   an encoding unit that encodes block segmentation information of the target block,
   wherein the block segmentation unit includes:
      a quartering unit that quarters the target block in recursive segmentation in a horizontal direction and a vertical direction to generate four blocks, and
      a halving unit that halves the target block in recursive segmentation in the horizontal direction or the vertical direction to generate two blocks,
   wherein the block segmentation information contains a first flag indicating whether to quarter the target block and a second flag indicating whether to halve the target block,
   wherein the second flag is encoded in case that the first flag indicates that the target block is not quartered, and
   wherein when previous recursive segmentation is halving and the target block is of a predetermined size or smaller than the predetermined size, the halving unit prohibits the target block subject to current recursive segmentation from being segmented in a same direction as a direction in which the target block was segmented in the previous recursive segmentation, and thereby prevents block segmentation that results in a rectangle further elongated in the same direction.

2. An image encoding method adapted to segment an image into blocks and encode the image in units of blocks resulting from segmenting the image, comprising:
   recursively segmenting the image into rectangles of a predetermined size to generate a target block subject to encoding; and
   encoding block segmentation information of the target block,
   wherein the segmenting includes:
      quartering the target block in recursive segmentation in a horizontal direction and a vertical direction to generate four blocks, and
      halving the target block in recursive segmentation in the horizontal direction or the vertical direction to generate two blocks,
   wherein the block segmentation information contains a first flag indicating whether to quarter the target block and a second flag indicating whether to halve the target block,
   wherein the second flag is encoded in case that the first flag indicates that the target block is not quartered, and
   wherein when previous recursive segmentation is halving and the target block is of a predetermined size or smaller than the predetermined size, the halving prohibits the target block subject to current recursive segmentation from being segmented in a same direction as a direction in which the target block was segmented in the previous recursive segmentation, and thereby prevents block segmentation that results in a rectangle further elongated in the same direction.

3. An image decoding device adapted to decode an image in units of blocks resulting from segmenting the image, comprising:
   a block segmentation unit that generates a target block subject to decoding based on decoded recursive block segmentation information; and
   a decoding unit that decodes the target block,
   wherein the block segmentation unit includes:
      a quartering unit that quarters the target block in recursive segmentation in a horizontal direction and a vertical direction to generate four blocks, and
      a halving unit that halves the target block in recursive segmentation in the horizontal direction or the vertical direction to generate two blocks,
   wherein the block segmentation information contains a first flag indicating whether to quarter the target block and a second flag indicating whether to halve the target block,
   wherein the second flag is encoded in case that the first flag indicates that the target block is not quartered, and
   wherein when previous recursive segmentation is halving and the target block is of a predetermined size or smaller than the predetermined size, the halving unit prohibits the target block subject to current recursive segmentation from being segmented in a same direction as a direction in which the target block was segmented in the previous recursive segmentation, and thereby prevents block segmentation that results in a rectangle further elongated in the same direction.

4. An image decoding method adapted to decode an image in units of blocks resulting from segmenting the image, comprising:
   generating a target block subject to decoding based on decoded recursive block segmentation information; and
   decoding the target block,
   wherein the segmenting includes:
      quartering the target block in recursive segmentation in a horizontal direction and a vertical direction to generate four blocks, and halving the target block in recursive segmentation in the horizontal direction or the vertical direction to generate two blocks, wherein the block segmentation information contains a first flag indicating whether to quarter the target block and a second flag indicating whether to halve the target block, wherein the second flag is encoded in case that the first flag indicates that the target block is not quartered, and wherein when previous recursive segmentation is halving and the target block is of a predetermined size or smaller than the predetermined size, the halving prohibits the target block subject to current recursive segmentation from being segmented in a same direction as a direction in which the target block was segmented in the previous recursive segmentation, and thereby prevents block segmentation that results in a rectangle further elongated in the same direction.

5. A storing method adapted to store on a computer-readable recording medium bitstream generated in accordance with the image encoding method of claim 2.

6. A transmission method adapted to transmit a bitstream generated in accordance with the image encoding method of claim 2.

* * * * *